Sept. 22, 1959 E. G. MATKINS ET AL 2,905,867

PULSED LIGHT SENSITIVE CONTROL CIRCUIT

Filed Sept. 2, 1954 2 Sheets-Sheet 1

INVENTORS
Eugene G. Matkins &
Charles W. Miller
BY R. E. Fowler
ATTORNEY

PULSED LIGHT SENSITIVE CONTROL CIRCUIT

Filed Sept. 2, 1954 2 Sheets-Sheet 2

INVENTORS
Eugene G. Matkins &
BY Charles W. Miller
R. E. Fowler
ATTORNEY

United States Patent Office 2,905,867

Patented Sept. 22, 1959

2,905,867

PULSED LIGHT SENSITIVE CONTROL CIRCUIT

Eugene G. Matkins, Reelsville, and Charles W. Miller, Anderson, Ind., assignors to General Motors Corporation, Detroit, Mich., a corporation of Delaware Application September 2, 1954, Serial No. 453,762

10 Claims. (Cl. 317—130)

This invention relates to a light sensitive control system and more particularly to a light sensitive control system which may be used to control the energization of the bright and dim filaments of automobile headlamps.

Current automatic light sensitive control systems for dimming automobile headlamps utilize relatively high voltages. In order to provide such voltages it is necessary to incorporate a power pack or voltage supply unit which supplies the necessary higher voltages from the conventional storage battery source.

It is an object in making our invention to provide a light sensitive control system, the components of which do not require any higher voltages than that supplied by the conventional storage battery, and therefore a separate power supply section may be omitted.

It is a further object in making our invention to provide a light sensitive control system for automotive vehicles which will operate from storage battery voltage.

It is a further object in making our invention to provide a light sensitive control system in which oscillatory means are utilized to provide pulses, the amplitude of which are controlled by light sensitive means.

It is a still further object in making our invention to provide a pulsed light controlled circuit for dimming automotive headlamps in which the sensitivity of the system is varied between high beam and low beam positions.

Figure 1:
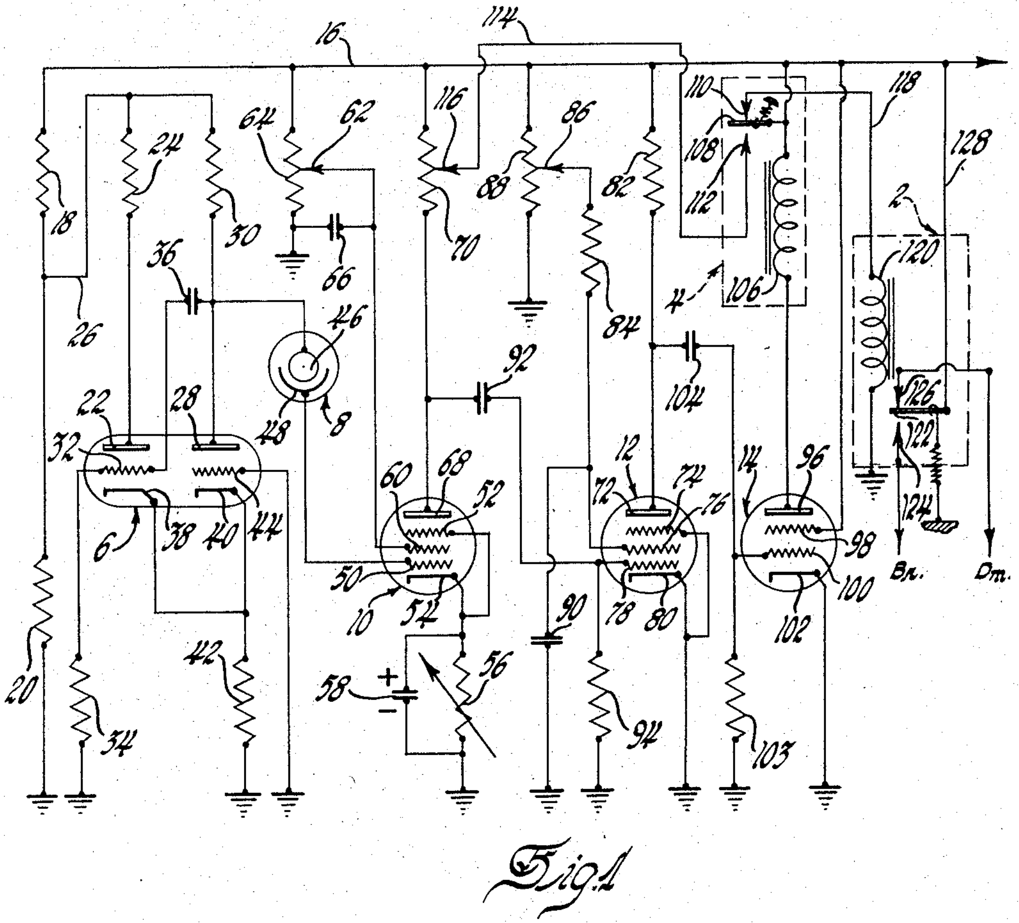
Figure 2:
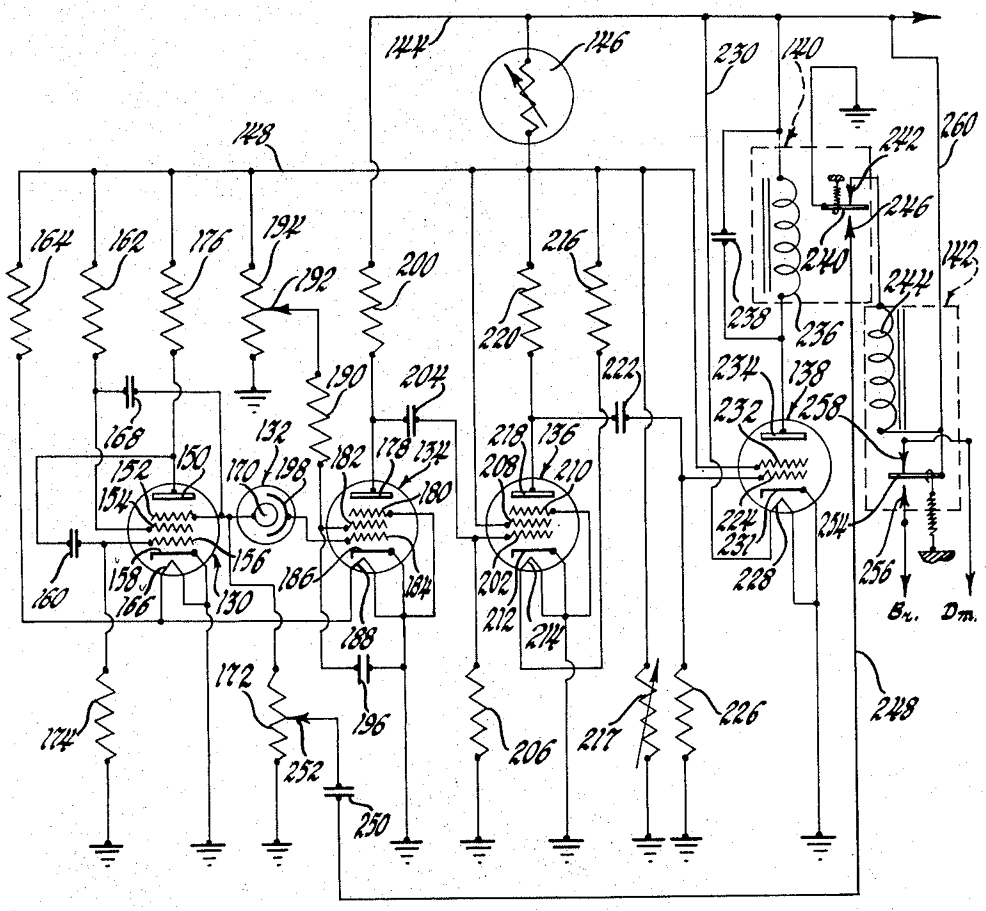

With these and other objects in view which will become apparent as the specification proceeds, our invention will be best understood by reference to the following specification and claims and the illustrations in the accompanying drawings, in which:

Figure 1 is a circuit diagram of a light controlled switching system embodying our invention; and Figure 2 is a circuit diagram disclosing a modified form of control system embodying our invention.

The system disclosed in Figure 1 actuates a power relay 2 which switches between high and low beam energization. The power relay is controlled, in turn, by a sensitive relay 4. The control system for these relays includes an oscillator for producing a series of pulses, which in this instance is illustrated as a multivibrator including tube 6, although any other type of oscillator may be used within the scope of our invention. The output of the oscillator is controlled by a photocell 8 and fed into two stages of alternating current amplification including tubes 10 and 12. The output of the last tube 12 is connected to a power amplifier stage including tube 14 directly controlling the sensitive relay 4.

The power line 16 is directly connected to a source of electrical power such as the conventional storage battery of an automotive vehicle, for example, as 12 volts. Two resistors 18 and 20 are connected in series between line 16 and ground providing a potential divider. The multivibrator consists of two triode sections in tube 6, which of course could be two separate tubes rather than two triode sections in one tube, together with its associated circuits. Plate 22 of the first section is connected through a limiting resistance 24 to line 26. Plate 28 of the second section is connected through resistor 30 to line 26. Line 26 is connected to a point intermediate resistances 18 and 20 to provide plate voltages for the tube.

The control grid 32 of the first section is connected to ground through biasing resistor 34 and also to plate 28 by coupling condenser 36. The cathodes 38 and 40 of the tube are connected together and to ground, through biasing resistor 42. The control grid 44 of the second section is grounded. This type of multivibrator is identified as the common cathode type.

The photocell 8 has its anode 46 connected directly to plate 28 and receives positive pulses from the output of the multivibrator. The cathode 48 of the photocell is connected directly to the first grid 50 of the amplifier tube 10. The suppressor grid 52 of the tube is connected to the cathode 54 and both are connected to ground through variable resistance 56. Condenser 58 is connected in shunt around resistance 56. The screen grid 60 is directly connected to variable tap 62 on resistor 64 which is connected between power line 16 and ground. This provides an adjustable voltage for the screen grid 60. A condenser 66 is connected between tap 62 and ground. The plate 68 of tube 10 is connected through resistance 70 to supply line 16.

The second amplifier stage includes tube 12 which has a plate 72, suppressor grid 74, screen grid 76, control grid 78, and cathode 80. The cathode 80 and suppressor grid 74 are connected together and to ground. The plate 72 is connected through resistor 82 to the supply line 16. The screen grid is connected through a resistor 84 to a variable tap 86 on resistor 88, which is connected between supply line 16 and ground, which provides an adjustment for the voltage applied to the screen grid. A condenser 90 is connected between grid 76 and ground for filter purposes. The output of the first amplifier stage is applied to the control grid 78 through coupling condenser 92, connected between plate 68 of tube 10 and control grid 78. A biasing resistance 94 is connected between grid 78 and ground.

The output of the two-stage amplifier including tubes 10 and 12 is applied to the power amplifier stage including tube 14. That tube is provided with a plate 96, a screen grid 98, a control grid 100 and a cathode 102. The cathode 102 is connected directly to ground and the screen grid 98 is connected directly to the supply line 16. The output of the previous amplifier stages is applied to the control grid 100 through coupling condenser 104 which is connected to the plate 72 of the last amplifier stage 12. A biasing resistor 103 is connected between grid 100 and ground. The plate 96 is connected directly to one terminal of the operating coil 106 of the sensitive relay 4, the opposite terminal of said coil being directly connected to the power supply line 16.

The movable armature 108 of the relay is also connected to the line 16 and is spring biased upwardly, as shown, into engagement with stationary contact 110, but may be moved downwardly into contact with stationary contact 112 upon energization of the relay coil 106. The stationary contact 112 of the relay 4 is connected through line 114 to an adjustable tap 116 on resistor 70. The switch thus provided by armature 108 and stationary contact 112 changes the voltage applied to the plate 68 of the first amplifier stage, and thus changes the sensitivity of the amplifier from one value during relay energization to a different value when relay 4 is deenergized. Stationary contact 110 of the relay 4 is connected through line 118 to one terminal of relay operating coil 120 of the power relay 2. The opposite terminal of this coil is grounded as shown. The movable armature 122 of the power relay is spring biased downwardly to engage a stationary contact 124, which is directly connected to the bright filaments of the headlamps, identified as Br. When relay coil 120 is energized to attract the armature 122 against the bias of the spring, the armature will engage stationary contact 126 which is connected directly to the dim filaments of the headlamps identified as Dm. The armature 122 is connected through line 128 to the power line 16.

In the operation of this control system the power amplifier 14 is normally conductive when no light falls on the photocell 8. Since this tube is conductive, a sufficient amount of current flows through relay coil 106 to attract its armature 108 and to hold it in the lower position. This completes a circuit from the power line 16 to the adjustable tap 116 on the resistor 70 to provide a certain plate voltage on amplifier tube 10. No circuit is completed to the relay coil 120 of the power relay 2, and therefore the spring biases the armature 122 downwardly to complete an obvious circuit to energize the bright filaments. During this time the multivibrator 6 is oscillating to provide a series of positive pulses in conventional multivibrator operation, but the resistance of the phototube 8 connected between the output of the multivibrator and the grid 50 of the amplifier tube 10 is so high that practically no signal is applied to the amplifier. As light falls on the phototube, its resistivity changes and positive pulses produced by the multivibrator 6 through its conventional oscillatory action are applied to control grid 50. The tube 10 amplifies the positive pulses applied to the grid to produce a series of amplified negative pulses which appear at the plate 68 of the tube 10. These are in turn applied to the control grid 78 of the second amplifier stage 12, which again amplifies the pulses and inverts them to produce a series of amplified positive pulses on the plate 72 of the tube 12. The positive pulses on plate 72 are applied to the control grid 100 of the power amplifier tube 14, but through the rectifier action of the cathode-grid of that tube they produce a negative bias on said control grid 100 to tend to cut off conduction through tube 14.

When sufficient light falls on the phototube 8 to produce a sufficiently high negative bias on tube 14, relay coil 106 releases its armature 108, permitting it to move back into contact with stationary contact 110, which completes a circuit to the power relay coil 120. This latter attracts its armature 122 to move it away from engagement with stationary contact 124 and into engagement with contact 126 to break the circuit to the bright light filaments and complete one to the dim filaments. Thus the control system switches to dim when a sufficient amount of light falls on the photocell. At the same time that relay armature 108 moved into engagement with stationary contact 110 to energize relay coil 120, it moved away from stationary contact 112, opening a circuit to plate resistor 70 to change the voltage applied to amplifier stage 10, and thus change the sensitivity of the amplifier, making it more sensitive, so that it will require less light to hold the system on dim energization than was required to originally cause it to switch to that condition. The adjustment of tap 116 on resistor 170 determines the amount of light necessary to cause the system to switch to dim and is therefore termed the dim control. The basic sensitivity of the system may be determined by the position of tap 62 on resistor 64. This may be termed the hold adjustment as it determines the amount of light necessary to hold the system on dim once it has been switched to that position. Two other variable resistances are provided, namely potentiometer 56 in the cathode circuit of the amplifier tube 10, which may be adjusted to set the control system originally to operate in a desired range as well as the adjustable tap 86 on resistor 88, which determines the screen voltage on the second amplifier stage 12. Voltage regulation for the system is supplied by the use of cathode resistance 56 and screen grid resistors 88, 64, and plate resistor 82. This type of circuit may be termed a dark actuated circuit in that the power tube conducts and maintains the sensitive relay energized during periods of no light on the phototube. When light does appear on the phototube, the latter permits the output of the multivibrator or other oscillator to be applied to the amplifier, which in turn applies a series of pulses to the control grid of the power amplifier to tend to cut off conduction through the same and permit the sensitive relay to release and switch to low beam.

The system shown in Figure 2 of the drawings incorporates the same basic principle, i.e., that of providing an oscillator to produce a series of pulses, and in having a photoelectric cell which controls the application of the oscillator output to an amplifier which in turn controls a power amplifier and a relay. The oscillator in this instance is of a different form, being known as a single pentode relaxation oscillator, and requires only one tube, which in this instance is indicated as tube 130. The output of this tube is controlled by a photocell 132, which is connected between the oscillator and the first amplifier stage 134, whose output is in turn again amplified through an amplifier 136, and the resultant signal applied to a power amplifier 138, which controls the sensitive relay 140. The sensitive relay controls the power relay 142, which does the actual switching of the headlight beams.

The power input line 144 is connected directly to any suitable source of power such as a conventional storage battery provided in automotive vehicles. A ballast tube 146 is connected between the main power line 144 and a second voltage supply line 148 to supply regulated voltage to the latter. The oscillator tube 130 has a plate 150, a suppressor grid 152, a screen grid 154, a control grid 156, and a cathode 158. The latter is connected directly to ground. The control grid 156 is connected through coupling condenser 160 to the plate 150. The screen grid 154 is connected through a resistor 162 to the regulated supply line 148. A limiting or dropping resistor 164 is connected between the regulated supply line 148 and one side of the filament 166 of the tube 130 to supply power thereto. The opposite side of the filament is grounded. A coupling condenser 168 is connected between screen grid 154 and suppressor grid 152, the latter being connected directly to the anode 170 of the photoelectric cell 132. The suppressor grid 152 is also connected to ground through resistor 172. A biasing resistor 174 is connected between ground and the control grid 156. The plate 150 of the tube 130 is connected to the regulated power supply line 148 through limiting resistor 176.

The first amplifier stage tube 134 is a pentode consisting of plate 178, suppressor grid 180, screen grid 182, control grid 184, and cathode 186. This tube is also provided with a filament 188 which has one terminal connected to the filament 166 of the tube 130 and the other terminal connected to ground and to the suppressor grid 180. The screen grid 182 is connected through a resistor 190 to an adjustable tap 192 on a resistor 194 which is connected between the regulated power supply line 148 and ground. A condenser 196 is connected between screen grid 182 and ground. The control grid 184 is directly connected to the cathode 198 of the photocell 132. The plate 178 of the tube 134 is directly connected to the unregulated main power supply line 144 through limiting resistor 200.

The output of the amplifier tube 134 is connected to the control grid 202 of the second amplifier tube 136 through a coupling condenser 204 which is connected to the plate 178 of the tube 134. A biasing resistor 206 is connected between the grid 202 and ground. Screen grid 208 of the second amplifier tube 136 is connected directly to the regulated power supply line 148. The suppressor grid 210 is connected directly to the cathode 212 and to ground. One side of the filament 214 of the tube 136 is grounded and the other side connected through a limiting resistor 216 to the regulated power supply line 148. The plate 218 of tube 136 is connected through limiting resistor 220 to the regulated power supply line 148. A variable resistance 217 is connected between line 148 and ground to adjust the line voltage. These two stages amplify the output of the oscillator as controlled by the photoelectric cell 132, and the output of the amplifier stages controls the conduction of the power amplifier tube 138.

The plate 218 of the tube 136 is coupled through a condenser 222 to the control grid 224 of the tube 138. A biasing resistor 226 is connected between control grid 224 and ground. One terminal of the filament 228 of the tube 138 is connected to the unregulated power supply line 144 through line 230 and the opposite side of the filament is grounded. The cathode 231 of the tube 138 is also grounded. The screen grid 232 of the tube 138 is directly connected to the regulated power supply line 148. The plate 234 of the tube 138 is connected to one terminal of the operating coil 236 of the sensitive relay 140, the opposite side of said coil being connected to the power supply line 144. A condenser 238 is connected across the coil 236 whose purpose will be later described.

The armature 240 of the sensitive relay 140 is biased upwardly as shown in the drawings to engage a stationary contact 242 which is in turn connected to one terminal of the operating coil 244 of the power relay 142. The opposite terminal of the coil 244 is connected to the line 260 for power supply. The movable armature 240 of the sensitive relay 140 is moved into engagement with a stationary contact 246 when the relay coil 236 is energized. Stationary contact 246 is connected through line 248 with a condenser 250 and thence to an adjustable tap 252 on resistor 172. The movable armature 240 of the sensitive relay 140 is connected to ground. The movable armature 254 of the power relay 142 is spring biased downwardly as shown into engagement with a stationary contact 256 which is directly connected to the bright filaments of the headlamps indicated as Br. When the energizing coil 244 of the power relay attracts the armature 254 and overcomes the spring bias thereof, it moves it into engagement with a stationary contact 258 which is directly connected to the dim filaments of the headlamps identified as Dm. The armature 254 is directly connected through line 260 to the unregulated power supply line 144.

In this system the single pentode relaxation oscillator produces a series of positive pulses on the suppressor grid 152 which result from voltage changes on the screen grid 154, coupled thereto through conventional action of this type of relaxation oscillator. These pulses are applied directly to the anode 170 of the photoelectric cell 132 connected thereto. If no light falls on the photocell, the resistance of the same is so high that substantially no signal is applied to the control grid 184 of the first amplifier stage and therefore there is little output, if any, from the two-stage amplifier consisting of tubes 134 and 136. The circuit is so designed that, at this time, the power amplifier tube 138 is conducting and the flow of current through this tube in series with the energization coil 236 of the sensitive relay 140 holds armature 240 in its attracted position in engagement with the stationary contact 246. This provides a completed circuit through a bypass line 248 around a portion of the resistor 172, and therefore determines the sensitivity of the set during no light conditions, or rather determines the amount of light necessary to cause the set to switch to low beam or dim position. At this time also the circuit will be incomplete to the energizing coil 244 of the power relay, maintaining the coil 244 deenergized, and therefore the spring bias holds armature 254 in its lower position, completing an obvious circuit to the bright filaments.

As light increases on photocell 132, the resistance thereof decreases and therefore pulses are now applied to the control grid of the tube 134, the amplitude of which is determined by the amount of light falling on the photocell. These pulses are amplified in tubes 134 and 136, producing an amplified positive pulse series on plate 218 of tube 136. These positive pulses are applied to the control grid 224 of tube 138 through coupling condenser 222 and drive this grid negative due to the rectifying action of the cathode and grid of the power amplifier tube. Thus with the increase in light on the photocell 132, a point is reached where the conduction through said power amplifier tube 138 is decreased to a point where the armature 240 is released to move away from stationary contact 246, breaking the shunt circuit for resistor 172 and completing a circuit to energize relay coil 244, causing it to attract its armature 254, breaking the circuit to the high beam or bright filaments and completing a power supply circuit to the dim filaments.

As before mentioned, the adjustment of tap 252 on resistor 172 determines the sensitivity of the set when no light falls thereon and the point at which it will switch to low beam. However, it is desired to change the sensitivity of the set at that instant so that a much smaller amount of light will maintain the control system on low beam energization than that required to originally switch it to low beam. Thus contact 246 is opened immediately upon switching to low beam. To determine the sensitivity of the control system on low beam or that amount of light which is required to hold the system on low beam, there is provided the adjustable tap 192 on resistor 194. The position of this tap determines the screen grid voltage on the first amplifier stage and the sensitivity for the so-called hold position.

The provision of the condenser 238 around the operating coil 236 of the sensitive relay 140 provides a very slight time delay action in the operation of this relay. It therefore prevents the operation of the relay for a short time after a change in light condition. This would prevent the operation of the system on short flashes of light caused by rays from the headlamps striking signs, etc. It also provides a slight delay in the return to high beam position after the incident light is removed, but this delay is not critical.

We claim:

1. In a light sensitive control system for electrically operated switching means, a source of electrical power, an oscillator connected thereto and having an output circuit, amplifying means connected to the source of power and having an input and an output circuit, a light sensitive cell connected directly to the oscillator output and the amplifier input to control the transfer of energy from the oscillator to the amplifier in accordance with the amount of light falling on the photocell, the amplifier output being connected to said electrically operated switching means.

2. In a light sensitive control system for relay switching means, a source of electrical power, an oscillator connected thereto and having an output circuit, amplifying means connected to the source of power and having an input and an output circuit, a light sensitive cell connected directly to the oscillator output and the amplifier input to control the transfer of energy from the oscillator to the amplifier in accordance with the amount of light falling on the photocell, the output of the amplifier being connected to said relay switching means.

3. In a light sensitive control system, a source of electrical power, an oscillator connected thereto to produce a plurality of positive pulses and having an output circuit, a light sensitive means connected directly in said output circuit, an amplifier connected with the source of power and having an input and an output circuit, said input circuit being connected directly to said light sensitive means so that the amount of light falling on the light sensitive means will vary the amplitude of the positive pulses applied to the input of the amplifier, said amplifier producing amplified positive pulses in its output, an electron tube whose conductance provides a desired control function, said tube having a grid, cathode and plate, said plate being connected with the source of power and said grid being connected to the output circuit of the amplifier, and biasing resistance means connected between the grid and ground.

4. In a light sensitive control system for relay switching means, a source of electrical power, an oscillator connected thereto to produce a plurality of positive pulses and having an output circuit, a light sensitive means connected directly in said output circuit, a multistage amplifier having an input circuit connected directly to said light sensitive means, adjustable biasing means connected to said amplifier, the output of the amplifier means being connected to said relay switching means to control desired apparatus as the quantity of light falling on the light sensitive means changes.

5. In a light sensitive control system, a source of electrical power, a multivibrator connected to said source of power producing an oscillatory voltage, a photoelectric cell connected to said multivibrator and upon which said oscillatory voltage is impressed, an amplifier tube having a plate, screen grid, control grid and cathode, said control grid being connected to said photoelectric cell and having impressed thereon oscillatory voltage from the multivibrator as adjusted by the photoelectric cell, an adjustable resistance connected between the cathode and ground to vary the cathode bias, and a variable resistance between the screen grid and source of power to adjust the screen grid bias, said plate of the amplifier tube being connected to desired control apparatus and to the source of power for energization thereby.

6. In a light sensitive control system, a source of electrical power, a multivibrator connected to said source of power producing an oscillatory voltage, a photoelectric cell connected to said multivibrator and upon which said oscillatory voltage is impressed, an amplifier tube having a plate, screen grid, control grid and cathode, said control grid being connected to said photoelectric cell and having impressed thereon oscillatory voltage from the multivibrator as adjusted by the photoelectric cell, an adjustable resistance connected between the cathode and ground to vary the cathode bias, a variable resistance between the screen grid and source of power to adjust the screen grid bias, means for applying a varying potential to the plate of the tube, further amplifying means having an input and an output circuit for amplifying the output of the tube, said input circuit for said further amplifier being connected to the plate of said tube, and means for providing an adjustable bias on the further amplifier means, said output circuit of the further amplifier connected to desired apparatus to control the operation thereof dependent upon the amount of light falling on the photocell to control the amplitude of oscillations applied to the amplifying means.

7. In a light sensitive control system, a source of electrical power, an oscillator producing a series of voltage pulses connected to said power source, amplifying means including a plate, screen grid, control grid and cathode, separate adjustable means connected to the plate, screen grid and cathode for adjusting the voltage of each, a photoelectric cell connected between the oscillator and the control grid to apply oscillations generated by the oscillator to said control grid as modified by the amount of light falling on the photocell, relay switching means connected to the output of the amplifying means to control desired apparatus, additional switching means actuated by the relay switching means connected to the adjustable means in the plate circuit of the tube to vary the plate voltage between relay energized and deenergized positions.

8. In a light sensitive control system, a source of electrical power, a voltage regulating means connected thereto, a supply line for regulated voltage connected to said regulating means, an oscillator connected to said supply line and producing a plurality of voltage pulses, a photoelectric cell connected to said oscillator to modify the pulses applied thereto, an amplifier connected to the photoelectric cell to amplify the modified pulses fed through the photocell, adjustable biasing means for the amplifier connected to said regulated line, said amplifier being connected to apparatus it is desired to control.

9. In a light sensitive control system, a source of electrical power, a voltage regulating means connected thereto, a supply line for regulated voltage connected to said regulating means, an oscillator connected to said supply line and producing a plurality of voltage pulse, a photoelectric cell connected to said oscillator to modify the pulses applied thereto, an amplifier connected to the photoelectric cell to amplify the modified pulses fed through the photocell, adjustable biasing means for the amplifier connected to said regulated line, biasing means connected between the oscillator and photocell and ground, an adjustable tap on said last-named biasing means and relay switching means in the output of the amplifier connected to said adjustable tap and to means to be controlled to change the sensitivity of said control system as the switching means is actuated.

10. In a light sensitive control system, a voltage regulated supply line, a pentode relaxation oscillator connected thereto to produce a series of positive voltage pulses, a photoelectric cell connected to the output of the oscillator, amplifying means having an input and an output circuit, said input circuit being connected to the photocell to amplify the oscillator output as modified by the photocell, and adjustable biasing means connected to the amplifying means and to the regulated supply line to provide output adjustment to control desired means.

References Cited in the file of this patent

UNITED STATES PATENTS

| | | |
|---|---|---|
| 2,228,163 | Cohen | Jan. 7, 1941 |
| 2,590,826 | Schenck | Mar. 25, 1952 |
| 2,682,624 | Atkins | June 29, 1954 |
| 2,730,629 | Atkins | Jan. 10, 1956 |